July 4, 1933.  H. G. ROSS  1,916,389
CAPACITOR MOTOR
Filed Feb. 28, 1931
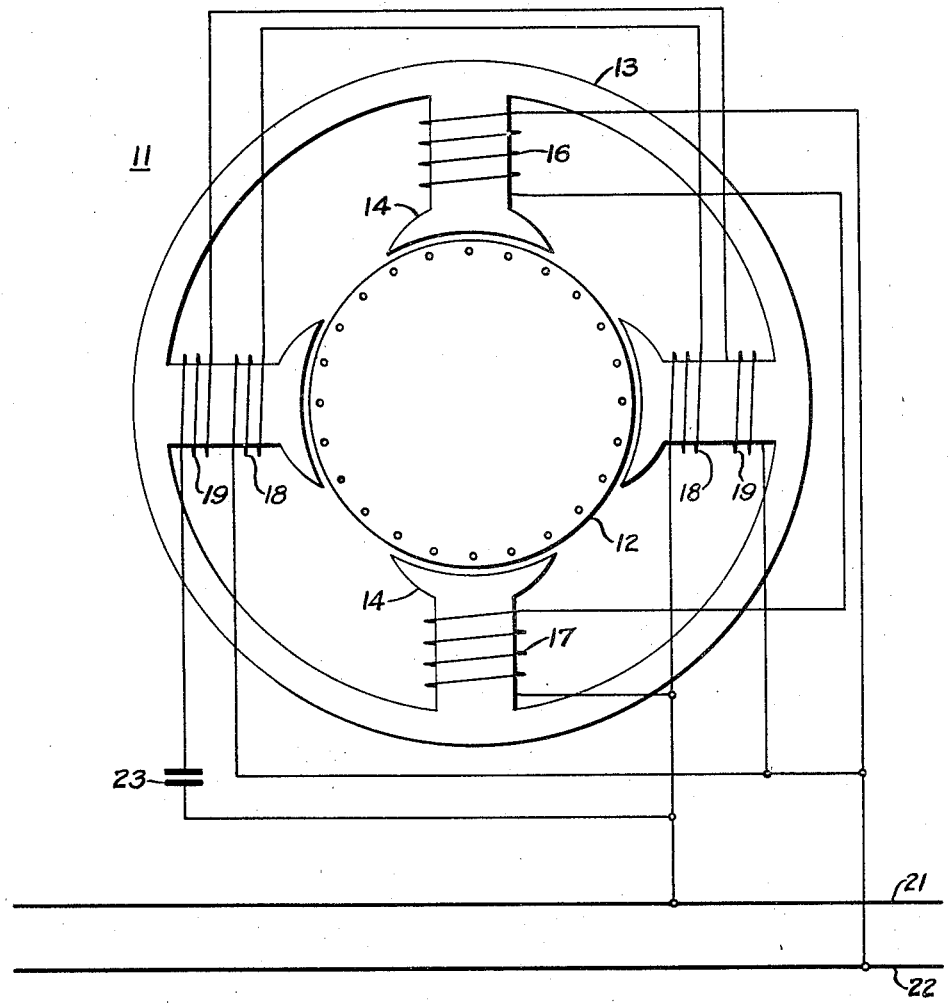
WITNESSES:
INVENTOR
Hugh G. Ross.
BY
ATTORNEY Patented July 4, 1933

1,916,389

UNITED STATES PATENT OFFICE

HUGH G. ROSS, OF WILKINSBURG, PENNSYLVANIA, ASSIGNOR TO WESTINGHOUSE ELECTRIC & MANUFACTURING COMPANY, A CORPORATION OF PENNSYLVANIA

CAPACITOR MOTOR

Application filed February 28, 1931. Serial No. 519,116.

My invention relates to alternating-current motors and particularly to capacitor motors.

An object of my invention is to provide a relatively simple construction for a single-phase capacitor motor, in which the condenser is to be energized at a voltage higher than the line-energizing voltage.

In practicing my invention, I provide an induction motor embodying a rotor of any desired design, a stator structure having a main energizing winding, and a two part auxiliary energizing winding and a condenser connected to the outside terminals of the two auxiliary windings.

The single figure of the drawing illustrates schematically, an induction motor embodying my invention.

A capacitor motor 11 includes a rotor 12, which is here shown as of the squirrel cage construction but which may be of any other type employed in such motors. I have not shown a shaft for the rotor or bearings for the shaft, as such elements constitute no particular part of my present invention and have, therefore, been omitted for the sake of clearness.

A stator structure includes a set of laminations 13 embodying the usual yoke portion and a plurality of pairs of salient pole pieces 14. While I have illustrated a particular embodiment of a stator and more particularly of the laminations thereof, I desire it to be understood that any stator structure, effective for the same general purpose, may be employed and that I do not wish to be restricted to the use of salient poles. It is further to be understood that the stator structure has associated therewith, the usual bearing brackets for supporting the shaft of the rotor 12.

The stator has located thereon a main winding, including, in this particular case, two coils 16 and 17 and an auxiliary winding which is displaced by ninety electrical degrees from the main windings and includes two portions 18 and 19 on each of the other salient poles, as shown in the drawing. A supply circuit for the motor includes supply-circuit conductors 21 and 22, and the main winding coils 16 and 17 are connected in series-circuit relation directly across the supply-circuit conductors 21 and 22.

The energizing circuit is connected to one terminal of one of the auxiliary winding coils 18 and to the other terminal of the second coil 18. A condenser 23 is connected to the extreme outer terminals of all of the series-connected windings 18 and 19, the effect being that one-half of the auxiliary windings, and particularly the coils 18, are connected across the conductors 21 and 22 of the supply circuit to be energized thereby, while the condenser will be energized by the combined effect of the two sets of coils 18 and 19, and the voltage at the terminals of the condenser will, therefore, be much higher than that of the energizing circuit.

Thus, if the number of turns in windings 18 is the same as that in windings 19, the voltage supplied to the condenser 23 will be substantially twice that of the supply circuit, and the necessary capacitance will, therefore, be reduced to one-fourth, for reasons well known in the art.

The device embodying my invention thus provides a stator structure for a motor in which the auxiliary windings are effective not only to provide a second phase electrically displaced relatively to the first or main phase winding, but the auxiliary windings located on the stator structure constitute also a step-up transformer to energize a condenser at a higher voltage to thereby permit of reducing the capacity of the condenser, while still obtaining the desired results.

It is obvious that the stator structure may be made slightly larger in order to accommodate the extra number of turns, of the auxiliary winding but this is a relatively easy matter and obviates the necessity of using a separate transformer which it has always been found difficult to properly locate on or near the motor and obtain the minimum number of conductors for connecting the condenser to the stator coils and to the supply circuit.

Since various modifications may be made in my invention without departing from the spirit and scope thereof, I desire that only such limitations shall be placed thereon as are imposed by the prior art or are set forth in the appended claims.

I claim as my invention:

1. A capacitor motor including a rotor, a stator structure having wound thereon a main winding energized at line voltage and an auxiliary winding, a predetermined portion of which, less than the total, is energized at line voltage, and a capacitor electrically connected to the terminals of the auxiliary winding.

2. A capacitor motor for energization at a normal voltage and including a rotor, a stator structure having wound thereon a main winding energized at normal voltage and an auxiliary winding, a capacitor electrically connected to the terminals of the auxiliary winding, and means for energizing a predetermined portion, less than the total, of the auxiliary winding at normal voltage.

3. A capacitor motor including a rotor, a stator structure having wound thereon a main winding having a predetermined number of turns and an auxiliary winding having a larger number of turns than the main winding, a condenser electrically connected to the terminals of the auxiliary winding, and means for directly energizing the main winding and a portion only of the auxiliary winding at a predetermined voltage.

In testimony whereof, I have hereunto subscribed my name this 17th day of February 1931.

HUGH G. ROSS.